Figure 4:
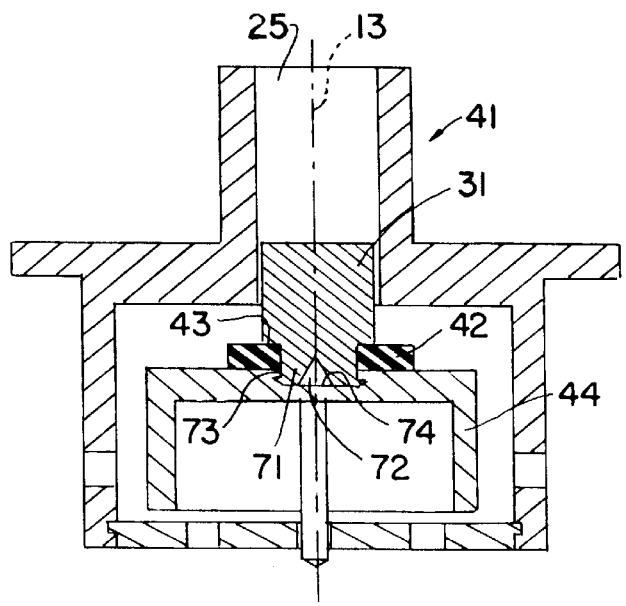
Figure 5:
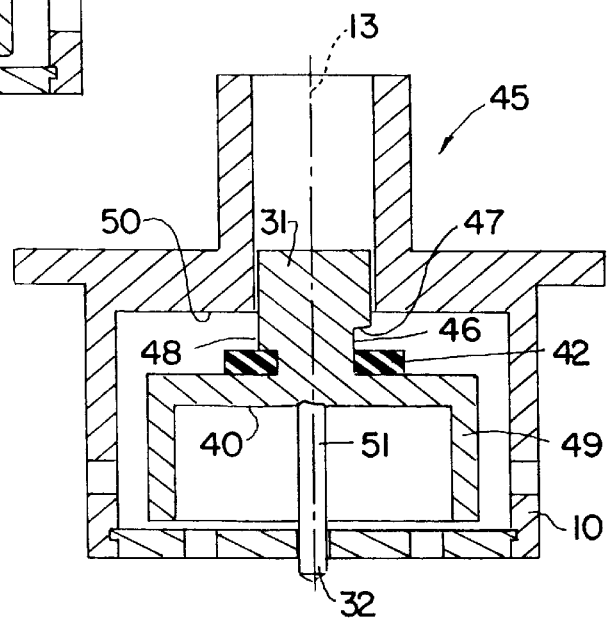

United States Patent [19]
Schiebold

[11] Patent Number: 6,119,712
[45] Date of Patent: Sep. 19, 2000

[54] FLOAT ARRANGEMENT FOR LIQUID CONTAINERS

[76] Inventor: Stefan Schiebold, Kornacherstrasse 3, 97421 Schweinfurt, Germany

[21] Appl. No.: 09/265,241

[22] Filed: Mar. 9, 1999

[30]    Foreign Application Priority Data

Mar. 10, 1998 [DE] Germany ............................ 198 10 093

[51] Int. Cl.⁷ .................................................. F16K 24/04
[52] U.S. Cl. ............................................. 137/202; 137/43
[58] Field of Search ........................................ 137/43, 202

[56]                References Cited

U.S. PATENT DOCUMENTS

| | | | |
|---|---|---|---|
| 1,611,458 | 12/1926 | Kempkey ................................. | 137/202 |
| 1,629,789 | 5/1927 | Harrison ................................ | 137/202 X |
| 4,893,643 | 1/1990 | Gifford et al. .......................... | 137/202 |
| 5,255,702 | 10/1993 | Journee ................................... | 137/202 |
| 5,755,252 | 5/1998 | Bergsma et al. ........................ | 137/202 |

FOREIGN PATENT DOCUMENTS

| | | | |
|---|---|---|---|
| 144816 | 6/1920 | United Kingdom ................... | 137/202 |
| 441795 | 1/1936 | United Kingdom ................... | 137/202 |

*Primary Examiner*—Gerald A. Michalsky
*Attorney, Agent, or Firm*—Pandiscio & Pandiscio

[57]             ABSTRACT

The invention is directed toward a float arrangement for liquid tanks in a housing with a cylindrical or prismatic cavity, one or more inflow openings being disposed at the bottom of the cavity and there being arranged at the top thereof at least one outlet opening that can be closed by the top of the float; according to the invention, disposed at the top and the bottom of the float are guiding elements of reduced cross section, extending approximately coaxially with the longitudinal axis thereof and cooperating with counterparts at the top or the bottom of the cavity.

13 Claims, 3 Drawing Sheets

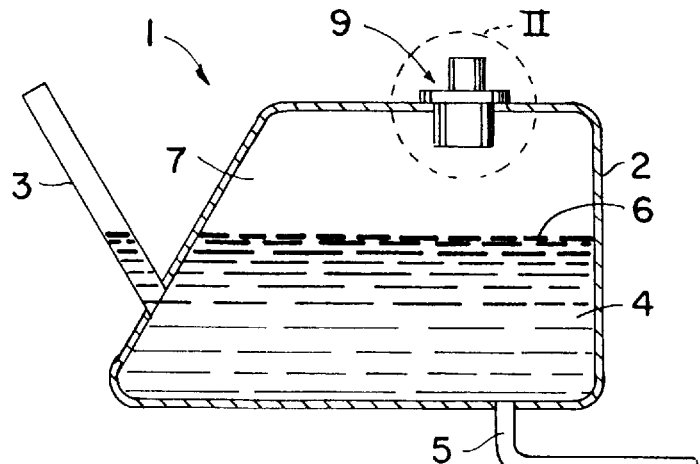
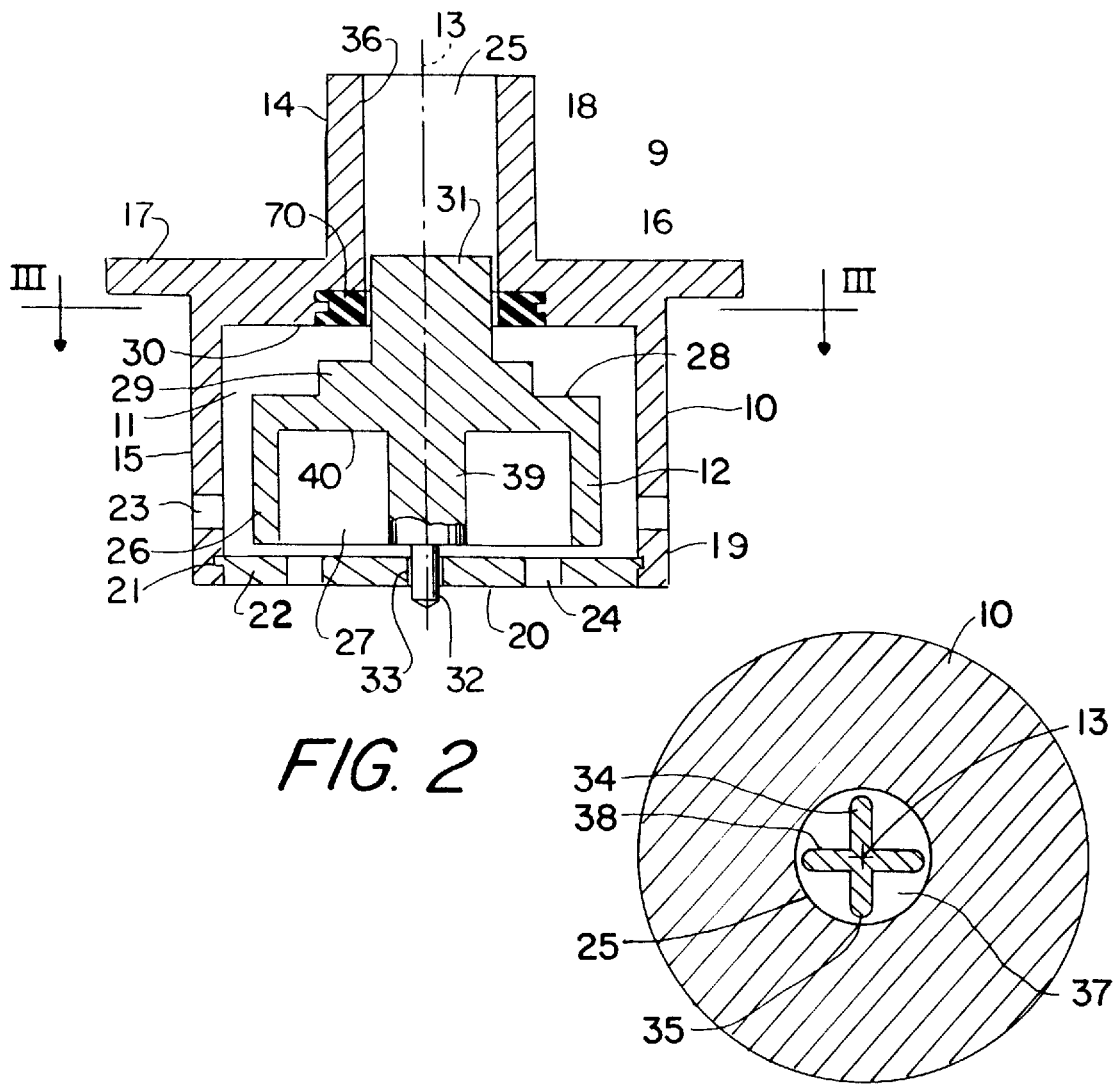
FIG. 1
FIG. 2
FIG. 3

FLOAT ARRANGEMENT FOR LIQUID CONTAINERS

The invention is directed toward an arrangement according to the preamble of the main claim.

In closed tanks for liquids in which the fill pipe opens into the lower region of the tank, a gas bubble is generated above the level of the liquid as soon as said level rises above the mouth of the fill pipe. To permit additional filling of the tank, this gas bubble must be given an opportunity to escape from the tank. This purpose is usually served by an air outlet opening disposed in the top of the tank. However, it is also necessary to keep liquid from spilling out of this air outlet opening if the tank is overfilled, and in many cases it is also necessary to prevent a constant exchange of gases with the inside of the tank, for example so that fumes will not constantly escape from hazardous liquids that it contains. Conversely, for example when the fill opening is closed, the tank must be supplied with air in order for it to be emptied. For this purpose, a vent valve of the aforesaid species is usually disposed at the top air outlet opening, while the float, which is able to move vertically to a limited extent in a cavity, is lifted above a preset level when the level of the liquid rises, thereby tightly closing the air outlet opening. If design measures are taken to ensure that an escaping gaseous medium must flow from the very bottom of the float cavity to an outlet in the top of the cavity, it is possible to achieve the additional reaction that when the tank is only partly filled the float glides down to the bottom of the cavity and occludes the inflow openings there, thus preventing a constant exchange of air in this case as well. During filling, however, the gas pressure increases, promptly lifts the float and thus makes it possible for excess air or gas to escape.

To achieve an adequate sealing effect, the vertical longitudinal axis of the float must always be oriented coaxially with the corresponding axis of symmetry of the housing cavity. To stabilize this position, axially parallel fillets have heretofore been formed on the casing surface of the float and engage corresponding groove-shaped depressions in the housing cavity to ensure the most parallel possible guidance of these elements. This method of stabilizing the float has proven utterly inadequate.

Various tanks for liquids, especially those built into vehicles, change positions during use, with the result that the force of gravity acts obliquely to the longitudinal axis of the float. The guide is consequently subjected to shear forces and the float is pressed against the casing surface of the cavity. The float is then "braked" on one side by friction against the wall of the housing and is tilted with respect to the guide. If this causes it to jam, the desired sealing function can no longer be performed reliably. The above-described tilting of the float inside its guide can be instigated by impacts or lateral forces—e.g., during the cornering of a vehicle—acting on the tank or by movements of the liquid in the tank.

Finally, floats are often made of a light plastic, and many plastics have a certain tendency to absorb small amounts of liquid and swell. This swelling causes the volume of the part to increase, which can also have a negative impact on the guidance of the float if the swelling of the float and that of the valve housing differ in degree. If the guide is too narrow due to excessive swelling of the float, then there is a risk that the float will become jammed; if the valve housing swells more than the float, then the precision of the guide decreases, making it possible for the float to assume increasingly tilted positions that also entail the risk of jamming.

The above-described disadvantages of the vent valve according to the species of prior art create the problem initiating the invention, that of improving such valves in such a way as to ensure optimum coaxial guidance of the float inside the valve cavity, even if the valve assumes tilted positions, impacts or lateral forces act on the tank, or the liquid in the tank is in motion, the precision of the guidance not being adversely affected by the tendency of individual components to swell due to the absorption of liquid.

To solve this problem, the invention provides, in a vent valve of the above species for the top of a liquid tank, that guiding elements are disposed at the top and bottom of the float and cooperate with counterparts at the top and bottom of the cavity to stabilize the float against undesired tilting and/or laterally displacing motions. These elements are intended to be integral parts of the float. For reasons relating to injection molding, for example, it may also be necessary to fabricate a separate guiding element that is connected to the float during the manufacture of the valve.

Because of their reduced cross section, such guiding elements undergo very little change in volume due to swelling, even when thoroughly soaked with a liquid, and these elements can therefore be realized with high precision. In this way, both the play and the frictional forces that must be overcome for displacement can be reduced to a minimum. Since, moreover, the support points used for the guidance have a maximal axial spacing between them, no perceptible tilting of the float body occurs even when a minimal residual play is used up, so that the risk of undesired jamming of the float body is completely eliminated. Since the contact surfaces between the float body and the housing cavity are limited to the small guiding elements, the float body cannot become jammed even if the contents of the tank are oily and the vent valve assumes comparatively sharply tilted positions, but instead can respond to every lifting and/or differential-pressure force promptly and with easy action. Furthermore, at its limits of travel the float body is always disposed against the top or bottom of the housing cavity in a plane-parallel manner and hence over its entire surface, thereby ensuring an optimum seal, so that if the tank is partially empty, for example, not even the slightest amounts of gas potentially laden with harmful substances can escape.

The invention further provides that disposed at the top and/or bottom of the float are approximately axial extensions, which are supported in an axially displaceable manner in recesses disposed in the top and/or bottom of the housing cavity. If the float body is made of plastic, such extensions can be manufactured along with the float body in a single operation by modifying the production mold for the float body, so that the fabrication of the valve according to the invention entails no extra cost whatsoever. The assembly of the vent valve according to the invention can also take place according to the same principle as heretofore, the sole difference being that instead of the previously necessary insertion of the guide fillets into the groove-shaped depressions provided therefor in the cavity wall, the extensions concerned must be brought into engagement with the corresponding recesses in the housing cavity.

A further embodiment according to the invention, in which the recess(es) in the top and/or bottom of the cavity pass completely through the housing, facilitates the manufacture of these guiding elements, which in such a case can be produced by means of shaping elements during the injection process, for example, or, in the case of metal housings, by means of cutting tools that can be introduced from the outside.

It is within the scope of the invention that the extension or extensions has or have a cross- or star-shaped or otherwise cut-out cross section. This serves, on the one hand, to further reduce the size of the contact areas between the guiding element of the float body and the guiding element of the valve housing, so that there is no further tendency to jam. In addition, in the case of guiding recesses that pass completely through the housing, a gaseous medium can flow through each of the cut-out regions of the extension of the float body, so that the task of the actual inlet or outlet openings is simultaneously transferred to the guiding elements, thereby further simplifying the design.

The invention allows of an improvement in that provided in the region of the base of one or more extensions is an elastic, particularly annular element for sealing the opening concerned. This element is operative in particular when the tank is completely filled, in which case the float is given buoyancy by the liquid and moves toward the top of the housing cavity. There, the elastic annular element disposed in the vicinity of the air outlet opening and projecting laterally beyond the cross section thereof abuts the inner surface of the cavity, thus creating a complete seal, so that neither any residual gas remaining in the tank nor the liquid itself can escape. For this purpose, the valve housing can, for example, be manufactured in multiple parts so that a planar sealing edge can be obtained at the outlet opening. This can be accomplished, for example, by means of a valve insert injection-molded around the region of the outlet opening. Due to the exact coaxial guidance of the float body, the elastic ring is optimally parallel to the inner surface of the cavity, so that no gap remains for any medium to pass through.

It has proven advantageous to insert the annular element in a circumferential, approximately groove-shaped depression in an extension. This prevents any axial displacement of the elastic element with respect to the float body, and as the float body sinks due to the emptying of the tank, the sealing ring follows promptly, thus uncovering the opening so that air can flow into the interior of the tank.

Further advantages result from an improvement of the invention according to which the top inner surface of the groove-shaped depression is inclined with respect to the longitudinal axis of the float. The effect of this inclination is that as the float body sinks, the force of its weight initially acts locally on the elastic seal at the lowest point on the inner surface of the groove and temporarily detaches the seal from the inner surface of the cavity in this local region. Such an embodiment serves the purpose of detaching a sealing ring that is adhering to the inside of the valve housing because the tank concerned has remained completely filled for a long period of time, so that the functional reliability of a vent valve according to the invention is ensured even under extreme operating conditions.

According to the teaching of the invention, vent valves can also be used in which the outlet opening in the lower region of the valve has a cross section that flares in an approximately conical shape in the direction of the float body. With such a design for the housing, the invention provides that the float extension concerned has in its part engaging the conical region a corresponding, approximately conical taper. These conically implemented regions of the guiding elements are oriented with utmost precision coaxially with the housing by the centering system according to the invention, so that their sealing effect is optimal.

The invention can be a component of a more complex air inlet and air venting system of a tank, in which valves with the same and/or different valve cross sections are disposed in series with and/or parallel to the direction of flow of the gas to the tank or its appurtenant system components. A plurality of valves can also be combined in one modular unit, thereby creating, for example, a combined valve with multiple functions, of which the invention can constitute one function.

Furthermore, for purposes of weight reduction the float body can also be constructed as hollow, approximately in the shape of a pot or a cylindrical bell. In such cases, the extension disposed in the region of the open end of the float body can extend approximately coaxially through the float body to its opposite end. This creates a throughpassing axle that carries the pot- or bell-shaped region of the float body and can be oriented exactly coaxially with the cavity. The arrangement is extremely stable and is also counterbalanced owing to the symmetrical weight distribution.

The pot or bell shape of the float can be improved in that the open end of the float is closed by a small annular plate. This small plate can be snapped into a groove running along the inside of the rim of the bell or pot and can then brace said bell or pot by means of its central recess, whose cross section is preferably fitted to the extension extending therethrough, thereby increasing the dimensional stability of the float body.

On the other hand, a bell- or pot-shaped float body permits a design improvement in that the surface of the housing located in the vicinity of the guiding recess and confronting the open end of the float extends approximately conically into the float body. This makes it possible to shorten the length of the extension concerned, so that it does not protrude from the bottom of the valve housing and is therefore protected against damage before and during the installation of the valve.

Another method for protecting the end of the extension concerned against damage is to increase the thickness of the floor of the valve housing in the region of the guiding recess. In this case, the extension concerned encounters a deeper guiding recess and can be assigned a length such that it never protrudes from the valve housing to any great degree.

The invention recommends an improvement of the valve by the arrangement of one or more additional openings on the periphery of the floor of the housing. These openings provide a means for both liquid and gaseous media to pass into the interior of the valve cavity, with the result that the cross section of the bottom extension can be fitted exactly to the relevant guiding recess in the valve floor, thereby imparting maximum stability to this extension, particularly in the case of a bell-shaped, hollow float body.

Further features, details, advantages and effects based on the invention will emerge from the following description of an exemplary embodiment of the invention and with reference to the drawings, which show:

FIG. 1 a liquid tank in longitudinal section with a vent valve according to the invention;

FIG. 2 an enlarged representation of Detail II from FIG. 1;

FIG. 3 a section through FIG. 2 along Line III—III;

FIGS. 4–8 further embodiments of the invention in similar representations to that of FIG. 2.

The tank for liquids depicted in FIG. 1 can be installed in a vehicle, for example to receive fuel. It comprises a housing 2 with a filler neck 3, through which the liquid 4 can be admitted, and a drainage opening 5 in the floor of the tank. As the tank I is filled, the liquid level 6 slowly rises, so that the air in the volume 7 above it has to escape to a corresponding extent. If the contents 4 of the tank 1 are gradually consumed 5, the liquid level 6 sinks, and the volume 7 must be filled to a corresponding extent. To permit such an equalization of pressure in the air volume 7 of the tank 1, disposed in the top 8 thereof is a vent valve 9. This, in addition to its primary function of pressure equalization, also serves to prevent liquid 4 from spilling out of the top 8 of the tank 1 if the tank 1 is overfilled through the filler neck 3. In the case of fuel tanks 1, in particular, the air in volume 7 above the liquid level 6 is laden with fuel vapors that are detrimental to health, and these vapors should, for the most part, also be kept inside the tank 1, at least as long as the liquid level 6 is not rising.

The vent valve 9 according to the invention is depicted in longitudinal section in FIG. 2. It comprises a housing 10 that encloses a cavity 11 in which a float body 12 is movably accommodated.

In the embodiment shown, the housing 10 has a rotationally symmetrical shape with an axis of symmetry 13. The outer configuration of the housing 10 is divided into two cylindrical regions 14, 15 of different diameter, separated from each other by a shoulder-like offset 16. Provided in the area of shoulder 16 is a fully circumferentially extending annular flange 17, which serves to fasten the vent valve 9 to the housing 2 of the liquid tank 1. Because this annular flange 17 is fastened to the tank housing 2 in a plane-parallel manner, the region 15 shown below the annular flange 17 in FIG. 2 is inside the tank 1, while the region 14 of smaller cross section than region extends outside the tank 1. The casing surfaces 18, 19 of both cylindrical regions 14, 15 are realized as integral to shoulder region 16 and annular flange 17 and are preferably injection-molded of plastic. The cavity 11 defined by inner cylinder region 15 is closed on one face by a bottom cover 20. The cover 20 can, for example, be snapped into a fully circumferentially extending groove 21 on the inside edge of cylinder region 19.

Provided both in the lower region of the casing surface 19 of inner cylinder region 15 and on the periphery 22 of bottom cover 20 are openings 23, 24 for the inflow of air and/or liquid 4 into cavity 11. Cylindrical region 25 enclosed by outer cylinder region 14 serves as an outlet opening through which the air present in the cavity 11 can escape to the outside. The degree to which valve 9 permits the passage through it of air is controlled by the movement of float body 12.

Float body 12 is approximately bell-shaped and has an approximately cylindrical casing surface 26, whose circumscribed interior 27 is closed at the top by an end face 28, but is open at the bottom. Disposed on the outside of end face 28 is an annular bead 29 whose diameter is greater than the diameter of outlet opening 22, so that said outlet opening can be closed by the rising of float 12 and the pressing of annular bead 29 against the surrounding inner face 30 of cavity 11. To achieve a completely tight seal, it is important that float body 12 be guided exactly coaxially with the axis of symmetry 13 of valve housing 10. This is accomplished by means of top and bottom extensions 31, 32 of float body 12, which engage corresponding recesses 25, 33 in housing 10 and bottom cover 20, respectively. Extensions 31, 32 are disposed coaxially with the axis of symmetry 13 of float body 12, while openings 25, 33 are disposed coaxially with the axis of symmetry 13 of housing 10. Because of the fact that a minimal amount of play (much smaller than that shown in the drawing) is provided between each extension 31, 32 and its recipient opening 25, 33, float body 12 is maintained exactly concentrically in housing 10. Since the overall height of the bell-shaped portion 26, 28, including annular bead 29, is smaller than that of the cavity 11, float body 12 is able to move to a limited extent inside cavity 11 in the direction of the longitudinal axis 13, and annular bead 29 simultaneously occludes or frees opening 25, depending on the position of float body 12. To improve the sealing effect, it is further possible to dispose a sealing element 70 cooperating with annular bead 29 and made, for example, of an elastic material, particularly injected, on the underside 30 of the stepwise offset 16 of the housing. The sealing element 70 can have an underside that is raised with respect to underside 30 and/or is provided with, for example, annular elevations.

As can be seen from FIG. 3, top extension 31 has an approximately cross-shaped cross section 34 whose peripheral termini 35 are at approximately the same distance from the axis of symmetry 13 as the inner surface 36 of opening 25, with the result that extension 31 is guided free from play. On the other hand, a gas, particularly air, encounters openings of sufficient cross section in the regions 37 between the individual arms 38 of the cross to be able to escape into the environment when float body 12 has sunk down, thereby freeing outlet opening 25.

Bottom extension 32 is connected via a coaxial transition piece 39 to the inside 40 of the end face 28 of bell-shaped float region 26, resulting in an axis 32, 39, 28, 29, 31 that extends vertically completely through float body 12. Bottom extension 32 does not serve as an air inlet opening and is therefore circularly implemented, like guiding recess 33, the residual play here again being within the technically achievable tolerances.

Float body 12 is also realized in one piece and is preferably injection-molded of plastic. It is therefore capable of absorbing liquid 4 to a limited extent and thus to swell slightly. However, since float body 12 is in contact with housing 10 only in the region of the inner surfaces 36 of guide openings 25, 33, whose volume change due to swelling is minimal owing to their extremely small cross section, there is no tangible reduction of the absence of play, and float body 12 is able to move 13 with easy action even after long periods of operation.

The valve embodiment 41 according to FIG. 4 differs from the embodiment 9 according to FIG. 2 primarily in that the annular bead there takes the form here of an elastic ring 42, which is inserted in a circumferential groove 43 at the bottom of extension 31 engaging outlet opening 25. The ring 42 is preferably made of a very soft sealing material, such as rubber, for example, enabling it to better seal opening 25. When float body 44 sinks, ring is immediately carried along with groove 43 due to their form-fitting cooperation, thereby freeing opening 25, so that air is able to flow into cavity 7 of tank 1. To simplify assembly, top extension 31 can be fabricated as a separate component from float body 44, with, for example, dovetail-shaped, undercut springs 71, which are able to spring inwardly due to a central recess 72, enabling them to be snapped into a recess 74 in the top of float body 44 by an inwardly projecting annular bead 73.

The valve 45 according to FIG. 5 again represents an improvement of valve 41 according to FIG. 4. Here again, there is an elastic sealing ring 42, which is form-fittingly fixed in the bottom region of top extension 31. In contrast to valve 41, however, here the ring is not inserted in a groove of constant cross section, but in a depression 46 encircling extension 31 and realized in particular in the form of corresponding, radial cut-outs in the arm or web regions 38 of extension 31. In contrast to valve 41, in valve 45 the width of depression 46, measured in the direction of the longitudinal axis 13 of the arrangement, varies between a minimum value that is approximately equal to the thickness of the ring 42 and a larger value that can, for example, be twice the thickness of the ring.

Since the upper boundary surface 47 of depression 46 conforms to a plane that can, for example, be inclined with respect to the longitudinal axis 13 of the arrangement, an asymmetrical arrangement is created in which elastic ring 42 is completely fixed in one region 48 of its extent, while in the opposite region it is able to move slightly in the axial direction 13 with respect to float body 49. This improves the behavior of sealing ring 42 in response to the sinking of float body 49. Should float body 49 be pressed constantly against the upper region 50 of the inside of the cavity due to the tank 1 being completely filled for a long period of time, there is a possibility that the elastic material will temporarily adhere to the inside 50 of this region. To overcome the adhesive force, due to the obliquely extending boundary surface 47 of depression 46, the entire weight of float body 49 in circumferential region 48 is transferred to elastic ring 42 and detaches it, locally at first, from the inner surface 50 of the cavity. If a gap is thereby created between the inner surface 50 of the cavity and the sealing ring 42, sealing ring can be pulled away without difficulty.

In the case of vent valves 41 and 45, the diameter of the transition piece 51 connecting bottom extension 32 to the inner surface 40 of float body 49 is cross-sectionally fitted approximately to extension 32, since the improved sealing properties and the relatively large clearance between float body 44,49 and housing 10 completely eliminate the risk of jamming of float body 44, 49.

Figure 6:
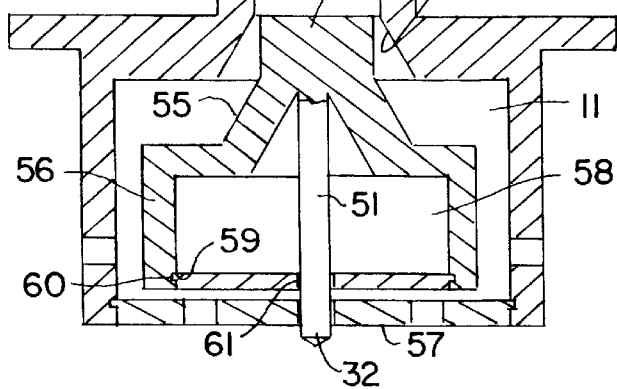

Embodiment 52 according to FIG. 6 shows that the principle of the invention can also be used in types of valves where the bottom of the outflow opening 25 is flared in an approximately conical shape, in that here the extension 54 concerned is also given a conical shape 55 at its base. Here, the sealing surface per se can be transferred directly to the conical region 53, 55, so that with constant lifting force, a higher contact pressure can be achieved in the area of the sealing surface because of the inclined conical casing surfaces 53, 55. This contact pressure can be increased further if, in this embodiment, the float body 56 is closed at its bottom by a disk 57. The enclosed volume 58 is therefore able to generate even greater lift than in the other embodiments. The disk 57 can be snapped by a peripheral extension 59 into a groove 60 extending completely around the inside edge of the bell-shaped float body 56. The disk 57 is provided with a central recess 61, through which the transition piece 51, forming extension 32, passes to the outside. Since recess 61 is cross-sectionally fitted to extension 32 or transition piece 51, liquid 4 is prevented from entering cavity 58.

Figure 7:
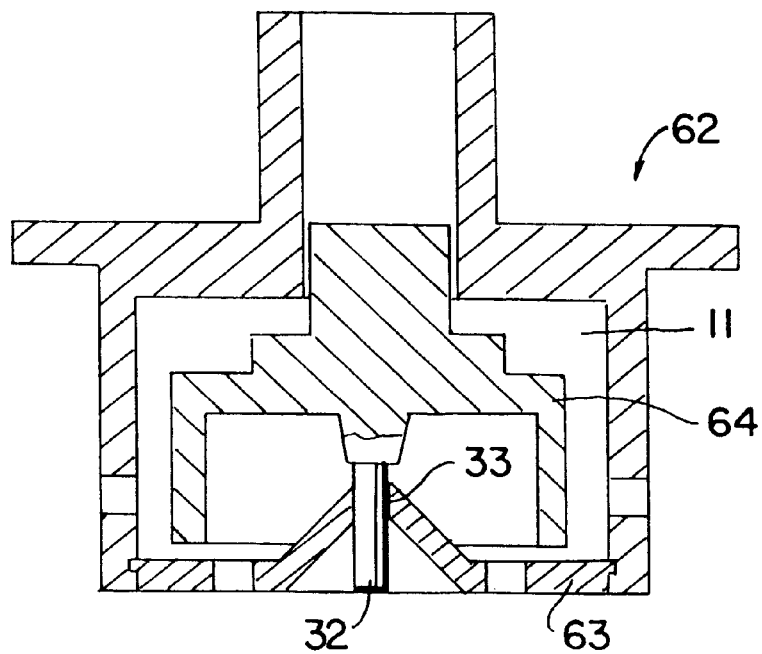

The vent valve 62 according to FIG. 7 differs from valve 9 of FIG. 2 in that here the cover 63 is bowed inwardly/outwardly in an approximately conical shape in the vicinity of the opening 33 for the passage of extension 32, so that the contact point with extension 32 in the cavity 11 of valve 62 is shifted inwardly. The length of extension 32 can therefore be reduced, so that it does not extend beyond the plane 63 of the cover even when the float body 64 has sunk to the downward limit of its travel, and is therefore at no risk of being damaged.

Figure 8:
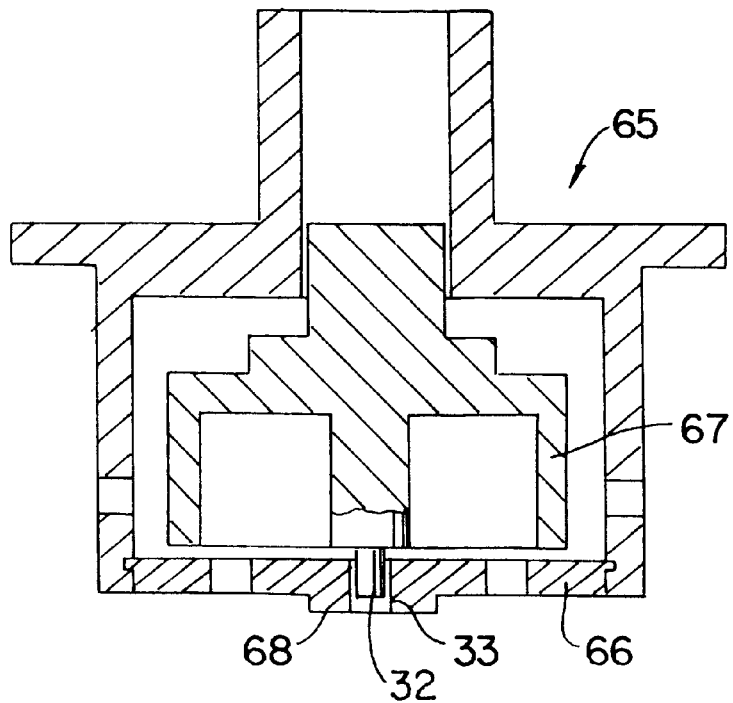

A similar effect is achieved with vent valve 65 according to FIG. 8, by the fact that the cover 66 is realized with an increased cross section in the vicinity 68 of the opening 33 receiving extension 32, such that this region 68 completely surrounds extension 32 protectively even when float 67 has sunk to the downward limit of its travel.

What is claimed is:

1. A vent valve (9, 41, 45, 52, 62, 65) for a top (8) of a tank (1) for liquids, said valve comprising a housing (10) having two portions (14, 15) of different diameters and separated from each other by a shoulder-like offset (16), wherein in an area of the offset (16) there is provided a fully circumferentially extending annular flange (17) which serves to fasten the vent valve (9) to a housing (2) of the liquid tank (1) in such manner that the portion (15) below the annular flange (17) is inside the tank (1), while the portion (14) of smaller cross section extends outside the tank (1), wherein the inner portion (15) of the valve housing (10) defines a cavity (11) adapted to accommodate a float (12) having a substantially corresponding external cross section, at least one inlet opening (23, 24) disposed in a bottom (20) of the cavity (11) and wherein a region enclosed by the outer portion (14) of the housing (10) comprises an outlet opening (25) that can be closed by a top portion (29) of the float (12), wherein disposed at a top and a bottom of the float (12), respectively, are upper and lower axial extensions (31, 32) of reduced cross section, extending substantially coaxially with a longitudinal axis (13) of the float and being slidably received, respectively, by the outlet opening (25) and a recess (33) at a top portion (30) and the bottom (20), respectively, of the cavity (11) to stabilize the float (12) against undesired tilting and laterally displacing motions, and wherein the upper axial extension (31) is provided with a cut-out cross section (34) having peripheral termini (35) at substantially an equal distance from the longitudinal axis (13) as an inner surface (36) of the outlet opening (25), such that the extension (31) is guided free from play, and wherein on an outside of a top end face (28) of the float (12) and in a bottom region of the upper extension (31) there is disposed the float top portion (29; 42) whose diameter is greater than the diameter of the outlet opening (25), such that the outlet opening (25) can be closed by rising of the float (12) and pressing of the top portion (29; 42) against the top portion (30) of the cavity (11).

2. A valve according to claim 1 wherein the outlet opening (25) and recess (33) in the top portion (30) and bottom (20) of the cavity (11), pass completely through the housing (10).

3. A valve according to claim 2 wherein there is provided in a bottom region of the upper extension (31) an elastic, annular element (42) for sealing the outlet opening (25).

4. A valve according to claim 3, wherein the elastic annular element (42) is inserted in a circumferential, substantially groove-shaped depression (43) in the upper extension (31).

5. A valve according to claim 4, wherein a top inner surface (47) of the depression (43) is inclined with respect to the longitudinal axis (13) of the float.

6. A valve according to claim 1, wherein the outlet opening (25) in a lower region thereof flares outwardly and substantially conically in the direction of the float body, and wherein a corresponding, substantially conical taper (55) is provided on a portion of the float that engages the outlet opening.

7. A valve according to claim 1, wherein said float comprises a substantial cylindrical-bell-shaped hollow float body (12), and wherein the lower extension (32) arranged in the region of an open end of the float body (12) extends substantially coaxially completely through the float body (12) to an opposite end (28) thereof.

8. A valve according to claim 7, wherein the bottom end of the float (12) is closed by an annular plate (57).

9. A valve according to claim 7, wherein a face (63) of the housing confronting the open bottom end of the float (64) extends substantially conically into the float body (64) in a vicinity of the guiding recess (33).

10. A valve according to claim 1, wherein the cavity bottom (20) is defined by a floor (66) and wherein a thickness of the floor (66) is increased in a region (68) of the guiding recess (33).

11. The valve in accordance with claim 1 wherein the upper axial extension is integral with the float.

12. The valve in accordance with claim 11 wherein the lower axial extension is integral with the float.

13. The valve in accordance with claim 12 wherein the float and axial extensions comprise a single unitary member of a plastics material.

* * * * *